Aug. 26, 1952 — R. A. BAUDRY — 2,608,071
CUTOUT COUPLING
Filed Nov. 21, 1946

WITNESSES:
Edward Michaels
W. H. Young

INVENTOR
René A. Baudry.
BY
Paul E. Friedemann
ATTORNEY

Patented Aug. 26, 1952

2,608,071

UNITED STATES PATENT OFFICE 2,608,071

CUTOUT COUPLING

René A. Baudry, Pittsburgh, Pa., assignor to Westinghouse Electric Corporation, East Pittsburgh, Pa., a corporation of Pennsylvania Application November 21, 1946, Serial No. 711,345

3 Claims. (Cl. 64—9)

This invention relates to flexible shaft couplings and, more particularly, to an improved form of flexible shaft coupling which may be easily and quickly connected for the purpose of transmitting rotary motion from one shaft to another.

Flexible shaft couplings of the type having a sleeve member provided with internal gears which mesh with external gears on hubs secured to the shafts connected by the coupling are well known. In some cases, it is desirable to operate one of the shafts without transmitting rotary motion to the other of the shafts, and couplings which will accomplish this feature have been made. In order to accomplish the disconnection of the shafts, a common expedient has been to shift the motion transmitting sleeve member axially so as to disengage the internal gear from the external gear on one of the hub shafts. U. S. Patent 1,666,445, dated April 17, 1928, illustrates one form of such coupling. One disadvantage of this form of disconnectable coupling is the fact that the relative movement of the disengaged gearing causes excessive stirring of the lubricating oil inside the coupling and consequent formation of foam which deteriorates the lubricating qualities of the oil. In addition, such action causes excessive leakage at high speeds making it necessary to drain the oil when disconnecting the coupling.

One of the principal objects of this invention is to provide a flexible shaft coupling which is readily and quickly disengageable and which overcomes the above-noted disadvantages of the prior art couplings.

A further object of the invention is to provide a coupling composed of two substantially identical parts, each part being connected to one of the shaft ends and providing a housing for the lubricating oil contained therein.

A further object of this invention is to provide a coupling of the character referred to in which there is provided a novel means for connecting the separate parts of the coupling together so as to render them operative to transmit rotary motion from one shaft to another.

A further object is to provide, in a coupling of the character referred to, a mounting for the separate parts of the coupling such that when the coupling is disconnected, the part of the coupling mounted on the shaft being rotated will rotate with such shaft and thereby eliminate stirring of the lubricating oil contained in such part.

Other objects and advantages of this invention will become apparent during the course of the following description taken in connection with the accompanying drawing, in which.

Figure 1:
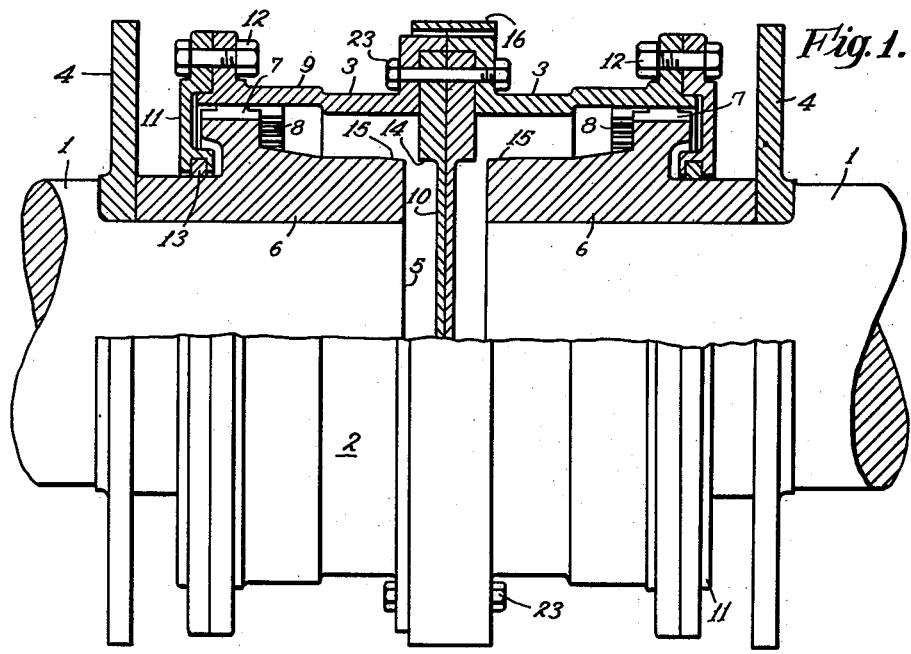
Figure 1 is a view, partly in elevation and partly in section, showing a coupling constructed in accordance with the principles of this invention in position for transferring rotary motion from one shaft to another.

Referring to the drawing, the numeral 1 designates the shafts to be connected by a flexible coupling indicated as a whole by the numeral 2. The coupling 2 is formed of two substantially identical parts 3 which are in the nature of a cup-shaped housing member mounted on the ends of the shafts 1. The cup-shaped members 3 form a receptacle for the lubricating oil for the motion transmitting gearing positioned within the members or parts 3.

In order that each shaft will be capable of transmitting rotary motion to its associated coupling part 3, each shaft is provided with an annular plate 4 secured thereto at a point spaced from an end 5 thereof. A hub 6 is keyed to the shaft intermediate the plate 4 and end 5. The hub 6 is provided with an external gear 7 which meshes with an internal gear 8 formed on the inner surface of a cylindrical shell 9. The open end of each shell 9 adjacent the shaft end 5 is closed by a circular plate 10 and its other end adjacent the plate 4 is closed by an annular plate 11 secured to the shell 9 by the bolts 12. The shell or casing 9 together with the plates 10 and 11 provide a housing for the shaft ends and the gearing 7 and 8 contained therein. Such housing provides a receptacle for the lubricating oil for the gearing 7 and 8. The annular plate 11 is provided with a sealing gland 13 which cooperates with the hub 6 to seal the inner end of the housing.

In order that the shafts may be engaged and disengaged with respect to each other, the parts 3 of the coupling 2 are shifted axially with respect to the shafts 1. In this respect, it will be noted that the internal gearing 8 is made sufficiently wide that such axial movement will not interrupt its meshing relationship engagement with the external gearing 7. By reason of this feature, there will be no relative movement between the gears 7 and 8 when the clutch parts 3 are disengaged, as in Fig. 2, and the clutch part 3 will rotate with the shaft on which it is mounted. There will thus be no relative gear movement and no stirring of the oil contained within such coupling part. The lubricating qualities of the oil will thus not be affected and the oil will not be forced out by stirring action at high speeds of operation.

Figure 2:
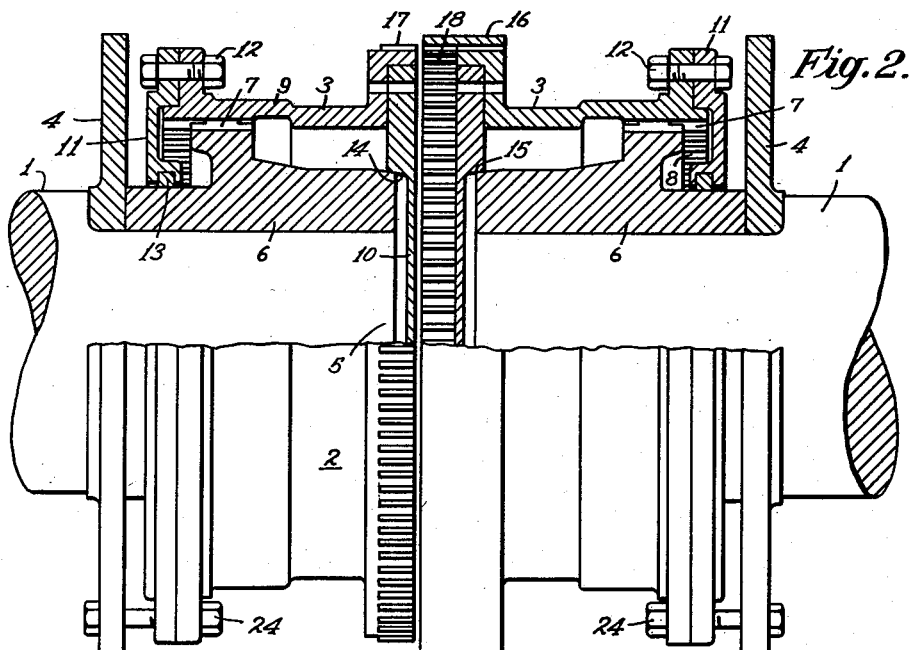
Figure 2 is a view similar to Fig. 1 but showing the position of the parts of the coupling when it has been rendered inoperable to transmit motion between the shafts.

Cooperating tapered surfaces 14 and 15 are formed on the plates 10 and hub 6 for positioning the shell 9 when the parts are moved to their disengaged position, as shown in Fig. 2. Upon movement of the clutch parts to such position, the surfaces 14 and 15 will engage to concentrically position the shell 9 with respect to the shaft 1 and will hold such shell securely in position.

Figure 3:
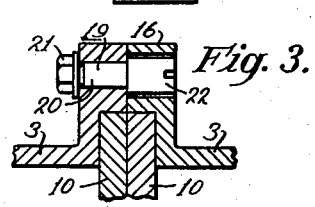
Fig. 3 is a sectional view illustrating a modified form of device for connecting or clutching the parts of the coupling together.

In order that the clutch parts 3 may be capable of transmitting rotary motion to and from each other, a positive clutch is provided at 16. The positive clutch 16 may be the internal and external gearing, as shown in Figs. 1 and 2, or the modified construction illustrated in Fig. 3. The clutching arrangement shown in Figs. 1 and 2 comprises an external gear 17 formed on one of the coupling parts and an internal gear 18 formed on the other of the coupling parts. In place of the gearing 17 and 18, the clutching may be provided by a plurality of motion transmitting members spaced peripherally about the ends of the coupling parts, such as the motion transmitting member 19 illustrated in Fig. 3. As shown in Fig. 3, the motion transmitting member 19 is provided with a reduced shank 20 positioned within an opening in one of the coupling parts 3 and held in such position by a nut 21. The enlarged end 22 of the member 19 is receivable in an opening formed in the other end of the coupling parts 3.

The purpose of the positive clutch 16 is to transmit rotary motion between the coupling parts 3 and to provide a connection for transmitting such motion which may be made quickly with a minimum of effort. Upon the movement of the coupling to the position illustrated in Fig. 1 with the clutch 16 operatively engaged, bolts 23 are applied to prevent movement of the coupling parts out of such position. Since the rotary motion is transmitted by the positive clutch 16, it is only necessary to employ two or three bolts 23, since little or no force is applied to such bolts. Upon movement of the clutch parts to their disengaged position, as shown in Fig. 2, bolts 24 may be applied for holding the clutch parts in such position. Since the bolts 23 and 24 function merely to hold the parts of the coupling from axial displacement, it will be seen that the coupling parts may be readily moved to and from their disengaged positions and securely held in such position.

Since various changes in this invention may be made without departing from the spirit and scope thereof, it is intended that all matters contained in the foregoing description and shown in the accompanying drawing shall be interpreted as illustrative and not in a limiting sense.

I claim as my invention:

1. In shaft coupling means, the combination of, a shaft provided with a selected number of gear teeth circumferentially thereof near one end of the shaft; a sleeve provided with internal gear teeth, the same in number as the selected number of external gear teeth on the shaft, meshing with the external gear teeth on the shaft, whereby said sleeve may be moved axially with reference to the shaft but upon rotation of the shaft rotates with the shaft; an annular member secured to the sleeve end remote from the shaft end; a liquid seal in the inner edge of the annular member, the disposition of the sleeve and the dimensions of the annular member and the liquid seal being such that the liquid seal fits snugly about the shaft at the side of the external gear teeth remote from the shaft end; a covering secured to the other end of the sleeve, the length of the sleeve being so chosen that the covering is spaced a relatively short distance from the shaft end when the annular member is contiguous to the side of the gear teeth on the shaft; a tapered circular recess in the face of the covering facing the shaft end and being disposed coaxially of the sleeve, the end of the shaft being slightly tapered to thus be received in the recess with a wedging action, when the sleeve is moved so that the annular member is spaced from the gear teeth on the shaft, a second shaft disposed in substantial alignment with the first shaft, and coupling means operatively connecting the first shaft, at the covering, to the second shaft to thus operatively couple the two shafts.

2. In shaft coupling means, the combination of, a shaft provided with a selected number of gear teeth circumferentially thereof near one end of the shaft; a sleeve provided with internal gear teeth, the same in number as the selected number of external gear teeth on the shaft, meshing with the external gear teeth on the shaft, whereby said sleeve may be moved axially with reference to the shaft but upon rotation of the shaft rotates with the shaft; an annular member secured to the sleeve end remote from the shaft end; a liquid seal in the inner edge of the annular member, the disposition of the sleeve and the dimensions of the annular member and the liquid seal being such that the liquid seal fits snugly about the shaft at the side of the external gear teeth remote from the shaft end; a covering secured to the other end of the sleeve, the length of the sleeve being so chosen that the covering is spaced a relatively short distance from the shaft end when the annular member is contiguous to the side of the gear teeth on the shaft; means on the shaft end and in the face of the covering adjacent the shaft end for securing the sleeve in axial alignment with the shaft and against axial movement on the shaft upon movement of the sleeve so that the annular member is spaced from the gear teeth on the shaft, a second shaft, and coupling means operatively connecting the first shaft, at the covering, to the second shaft to thus operatively couple the two shafts.

3. In coupling means for shafts, in combination, a shaft, an external gear fixed on the shaft a relatively short distance from one end of the shaft, a cup-shaped member having internal gear teeth, near the upper edge of the cup-shaped member, fitted in meshing relation over the said one end of the shaft, said cup-shaped member having a recess at its internal bottom adapted to snugly receive the shaft end upon movement of the cup-shaped member toward the shaft, an annular covering for the cup-shaped member, a fluid seal on the inner edge of the annular member, said fluid seal fitting snugly against the shaft to form a closed chamber over the shaft end wherein a lubricant is, in use, disposed, the depth of the cup-shaped member being such that said cup-shaped member may be shifted axially from a first position such that the shaft end is spaced a relatively short distance from the internal bottom of the cup-shaped member to a second position such that the recess in the internal bottom of the cup-shaped member engages the shaft end, a second shaft disposed in axial alignment to the first shaft with the adjacent end thereof disposed in spaced relation to the outer bottom of the cup-shaped member, clutching means on said second shaft, clutching means on the outer bottom of the cup-shaped member, and coupling means holding the clutching means in engagement, to operatively couple the two shafts, when said cup-shaped member is disposed in its first position.

RENÉ A. BAUDRY.

REFERENCES CITED

The following references are of record in the file of this patent:

UNITED STATES PATENTS

| Number | Name | Date |
|---|---|---|
| 1,595,612 | Morgan | Aug. 10, 1926 |
| 1,666,445 | Fast | Apr. 17, 1928 |
| 1,770,743 | Morgan | July 15, 1930 |
| 1,978,209 | Kuhns | Oct. 23, 1934 |
| 2,201,799 | Serrell et al. | May 21, 1940 |

FOREIGN PATENTS

| Number | Country | Date |
|---|---|---|
| 709,863 | Germany | Aug. 28, 1941 |